Figure 1:
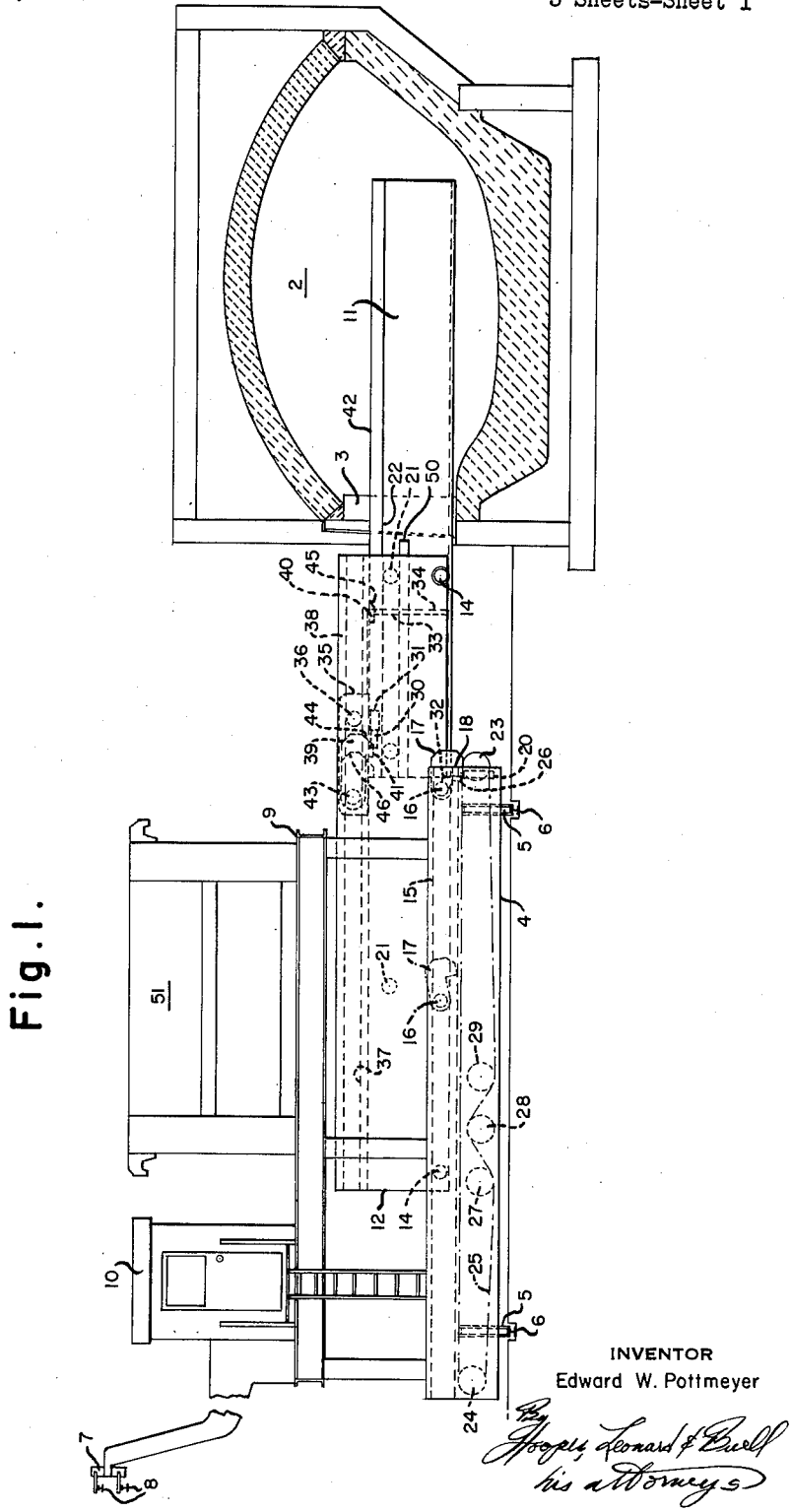

Oct. 12, 1965   E. W. POTTMEYER   3,211,304
FURNACE CHARGING METHOD AND APPARATUS
Filed Sept. 27, 1963   3 Sheets-Sheet 1

INVENTOR
Edward W. Pottmeyer

INVENTOR
Edward W. Pottmeyer

Oct. 12, 1965 E. W. POTTMEYER 3,211,304
FURNACE CHARGING METHOD AND APPARATUS
Filed Sept. 27, 1963 3 Sheets-Sheet 3

INVENTOR
Edward W. Pottmeyer

United States Patent Office 3,211,304
Patented Oct. 12, 1965

3,211,304
FURNACE CHARGING METHOD AND
APPARATUS
Edward W. Pottmeyer, Fox Chapel Borough, Pa., assignor to Blaw-Knox Company, Pittsburgh, Pa., a corporation of Delaware
Filed Sept. 27, 1963, Ser. No. 312,134
11 Claims. (Cl. 214—30)

This invention relates to a furnace charging method and apparatus and particularly a method and apparatus for charging melting furnaces of large capacity such, for example, as open hearth steel making furnaces.

For purposes of explanation and illustration the invention will be described as embodied in a method and apparatus for charging an open hearth furnace. The material charged into the furnace may be any material conventionally charged into a furnace of the general type in question; scrap metal may be considered as an example.

Heretofore in the practical art the charging of open hearth furnaces has been accomplished by introducing the charge material into the furnace in a charging box mounted on the end of a peel and dumping the charge. The charging box has had a capacity equal to only a small fraction of the capacity of the furnace hearth or in a multiple door furnace a small fraction of the capacity of the portion of the furnace hearth charged through each door. The charging of an open hearth furnace of modern size has become a lengthy, time-consuming process which greatly reduces operating efficiency, especially considering the reduced time now required for melting a heat of steel utilizing oxygen. Theoretical proposals have been made for substituting for the conventional small charging box means for introducing the charge into open hearth furnaces in greater unit quantities, but such proposals have been impractical and never put to actual production use.

I have devised a furnace charging method and apparatus providing for the practical and efficient introduction into a furnace of unit quantities of charge material many times as great as the unit quantities of charge material which it has heretofore been possible to introduce by use of the conventional charging box mounted on a peel. I introduce into charging position in relation to a furnace a material support having charge material resting thereon, dispose a plow behind the material and withdraw the material support progressively slides relatively to the blocks movement of the material which tends to move therepast along with the withdrawing material support and the material support progressively slides relatively to the material under the plow and out from under the material, depositing the material in the furnace. By utilization of such method I can introduce into a furnace a unit charge which may be the entire charge required for a heat or in the case of a multiple door furnace the entire portion of the charge for the part of the furnace hearth which is charged through the door through which the charge is introduced. For example, in a four-door open hearth furnace the furnace may be completely charged by introduction through each of the four doors of a unit charge equal to one-fourth of the entire charge for a heat. Thus the charging may be effected in a small fraction of the time heretofore required. Charging efficiency may be still further increased by utilizing more than one charging machine. For example, in charging a four-door open hearth furnace a charging unit consisting of two charging machines mounted side by side may be employed. The furnace may first be charged by introducing unit charges each equal to one-fourth of the entire charge for a heat through two doors at one end of the furnace, whereupon the charging unit may be traversed along the front of the furnace to position opposite the other two doors and similar unit charges introduced through those two doors. But greatly increased operating efficiency is realized even with the use of a single charging machine for the entire furnace.

A unit charge adapted to be charged according to my invention may be so great that it cannot all be contained in a charging receptacle disposed within the furnace. I provide for utilization of a charging receptacle of such great capacity that it cannot all be introduced into the furnace; yet by my novel method I can charge the entire contents thereof. I may advance at least partially into a furnace a material support having charge material resting thereon, dispose a plow behind the material, withdraw the material support under and past the plow so that the plow blocks movement of the material which tends to move therepast along with the withdrawing material support progressively slides relatively to the material under the plow and out from under the material depositing in the furnace a portion of the material on the material support, thereafter advance the material support with the remaining material resting thereon and with the plow therebehind and thereafter withdraw the material support under and past the plow so that the plow blocks movement of the remaining material which tends to move therepast along with the withdrawing material support and the material support progressively slides relatively to the remaining material under the plow and out from under the remaining material, depositing the remaining material in the furnace.

The material support may be a slidable bottom of a material receptacle which may be withdrawn from under the material relatively to the sides of the receptacle, but I prefer to utilize a receptacle in which the bottom and sides are unitary. I preferably introduce a receptacle containing charge material into charging position in relation to a furnace, fasten a plow in fixed position behind the material and withdraw the receptacle past the plow so that the plow blocks movement of the material which tends to move therepast along with the withdrawing receptacle and the receptacle progressively slides relatively to the material past the plow and out from under the material, depositing the material in the furnace. I find it advantageous to fasten the plow in fixed position behind the material when withdrawing the receptacle, although effective results can be realized by withdrawing the receptacle past the plow even though the plow may partake of some movement of its own during withdrawal of the receptacle.

My preferred furnace charging method comprises advancing at least partially into a furnace a receptacle containing charge material, disposing a plow behind the material, holding the plow stationary and withdrawing the receptacle past the plow so that the plow blocks movement of the material which tends to move therepast along with the withdrawing receptacle and the receptacle progressively slides relatively to the material past the plow and out from under the material, depositing in the furnace a portion of the material in the receptacle, thereafter advancing the receptacle containing the remaining material with the plow therebehind and thereafter holding the plow stationary and withdrawing the receptacle past the plow so that the plow blocks movement of the remaining material which tends to move therepast along with the withdrawing receptacle and the receptacle progressively slides relatively to the remaining material past the plow and out from under the remaining material, depositing the remaining material in the furnace.

Referring now to my furnace charging apparatus, such apparatus preferably comprises material supporting means, means for positioning the material supporting means in charging position in relation to a furnace, a plow, means for disposing the plow in juxtaposition to material on the material supporting means and means for bodily moving the material supporting means past the plow so that the material supporting means slide out from under the material while the plow blocks movement of the material which tends to move therepast along with the material supporting means to deposit the material in the furnace. I preferably utilize a receptacle for charge material with a plow in the receptacle and employ means for introducing the receptacle with charge material and the plow therein into charging position in relation to a furnace together with means for bodily moving the receptacle relatively to the plow so that the receptacle slides out from under the material while the plow blocks movement of the material which tends to move therepast along with the moving receptable to deposit the material in the furnace.

I preferably employ means for moving the receptacle with charge material and the plow therein in a plurality of steps into the furnace and provide means operable following each such step for bodily withdrawing the receptacle relatively to the plow so that upon each such withdrawal the receptacle slides out from under a portion of the material while the plow blocks movement of the material which tends to move therepast along with the moving receptacle to deposit such portion of the material in the furnace. I preferably employ means operable following each of such plurality of steps for fastening the plow in fixed position and bodily withdrawing the receptacle past the plow.

I desirably utilize mounting means and provide a receptacle for charge material mounted in the mounting means for movement relatively thereto and between a relatively remote position and charging position in relation to the furnace together with a plow in the receptacle advanceable with the receptacle and means maintaining the plow against retraction and in fixed relation to the mounting means when the receptacle is retracted from an advanced position.

The mounting means may comprise a supporting structure and a carriage. Preferably the carriage is mounted in the supporting structure for movement toward and away from the furnace and the receptacle for charge material is mounted in the carriage for movement relatively thereto and between a relatively remote position and charging position in relation to the furnace. A plow is provided in the receptacle together with first fastening means for fastening the plow to the receptacle, preferably at each of a plurality of positions along the receptacle, for advance with the receptacle and second fastening means for fastening the plow to the carriage, preferably at each of a plurality of positions along the carriage, against retraction when the receptacle is retracted relatively to the carriage.

My furnace charging apparatus may comprise a car movable into position in front of a furnace with a plurality of material supporting members mounted on the car and disposed generally in side-by-side relationship in a direction along the front of the furnace and means associated with each material supporting member for charging into the furnace material supported thereby. Preferably means are provided for positioning each material supporting member in charging position in relation to the furnace together with a plow for each material supporting member, means for disposing each plow in juxtaposition to material on the corresponding material supporting member and means for bodily moving each material supporting member past the corresponding plow so that the material supporting member slides out from under the material while the plow blocks movement of the material which tends to move therepast along with the material supporting member to deposit the material in the furnace.

When my furnace charging apparatus comprises a car movable into position in front of a furnace with a material supporting member mounted on the car I preferably provide a material carrier adapted to be set down on the car generally above the material supporting member and when desired to discharge material onto the material supporting member and means associated with the material supporting member for charging into the furnace material supported thereby received from the material carrier. A plurality of material supporting members may be mounted on the car and disposed generally in side-by-side relationship in a direction along the front of the furnace and a plurality of material carriers may be provided, one for each material supporting member, adapted to be set down on the car generally above the respective material supporting members and when desired to discharge material onto the respective material supporting members and means associated with each material supporting member for charging into the furnace material supported thereby received from the corresponding material carrier.

Other details, objects and advantages of the invention will become apparent as the following description of a present preferred method of practicing the same and a present preferred embodiment thereof proceeds.

In the accompanying drawings I have illustrated a present preferred method of practicing the invention and a present preferred embodiment thereof in which—

Figure 2:
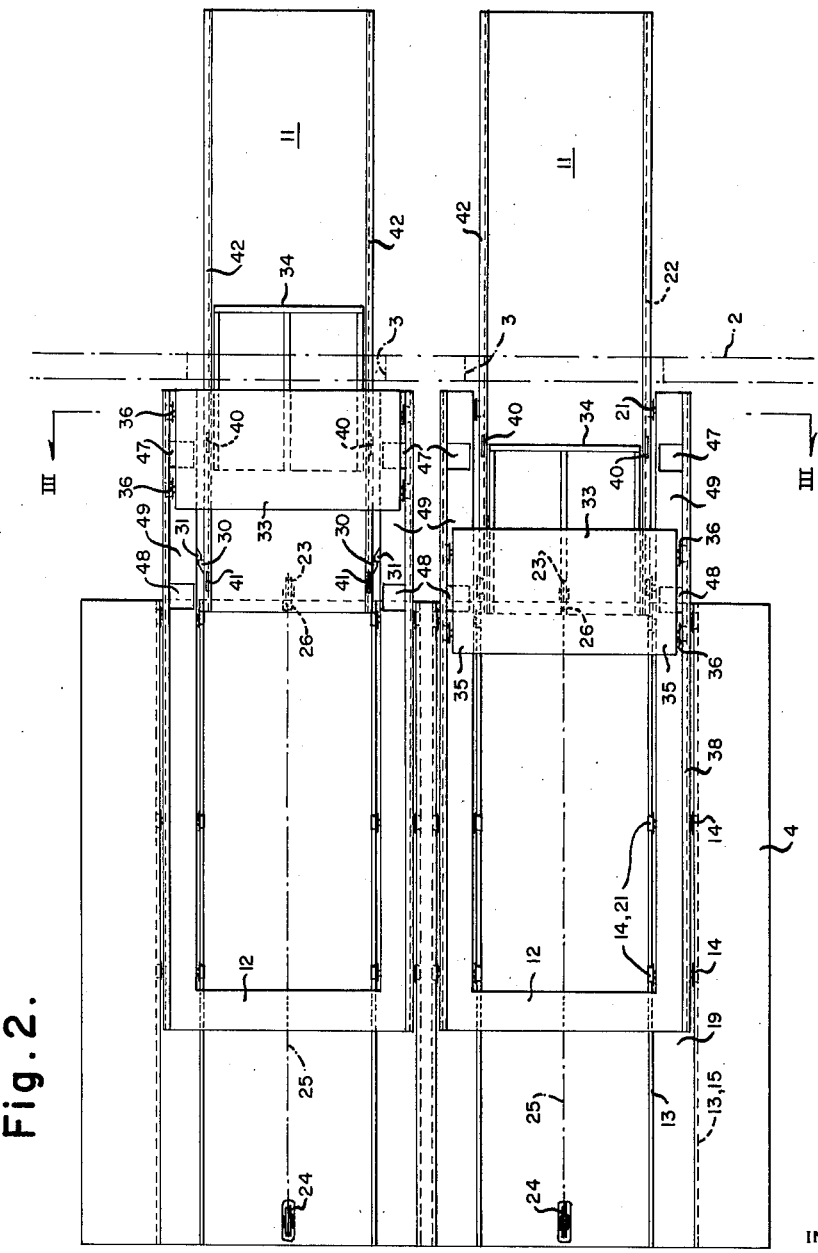
Figure 3:
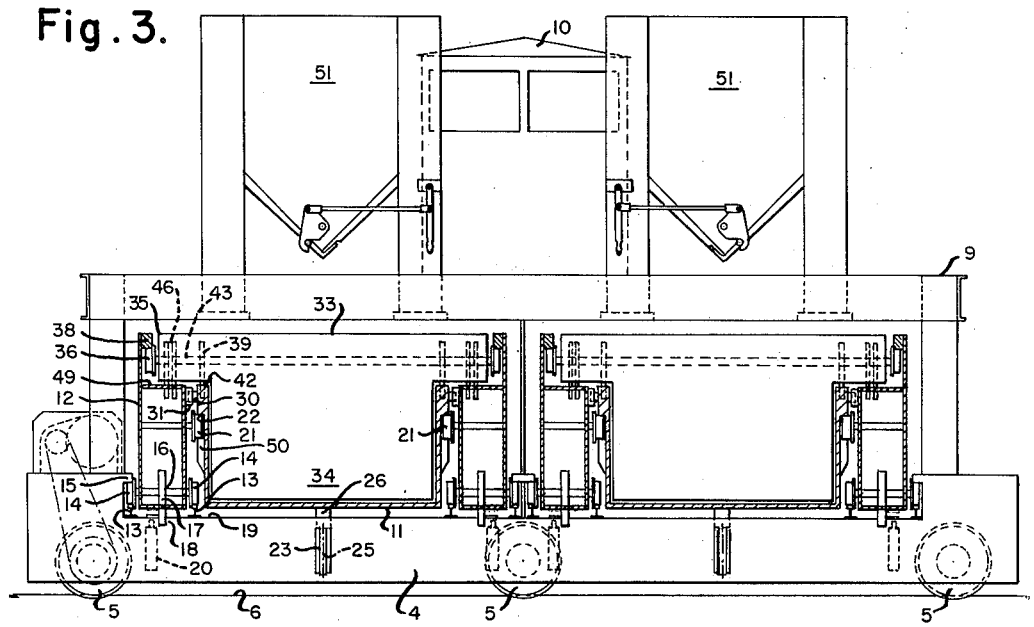
Figure 5:
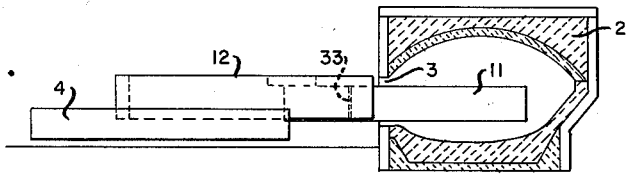
Figure 6:
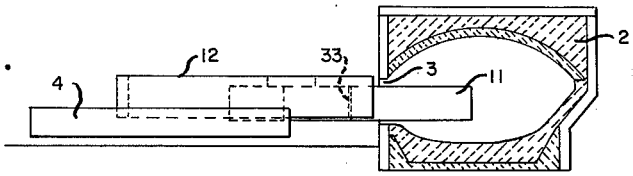
Figure 7:
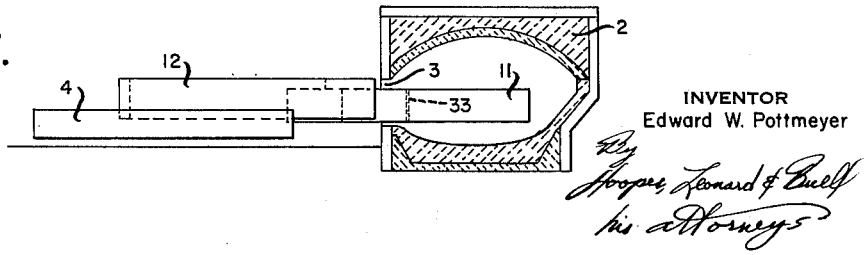

FIGURE 1 is a side elevational view of my furnace charging apparatus showing it extended into an open hearth furnace during charging of the furnace, the furnace being shown diagrammatically in cross section;

FIGURE 2 is a plan view of the principal portion of the furnace charging apparatus shown in FIGURE 1 showing two charging machines side by side which may be duplicates of each other, such machines being shown in different positions corresponding respectively to FIGURES 5 and 7 (the upper charging machine in FIGURE 2 being in the position corresponding to FIGURE 7 and the lower charging machine being in the position corresponding to FIGURE 5), the furnace and the portion of the charging apparatus including the operator's cab and the bucket for delivering the charge material to the receptacle therefor as well as other details being omitted;

FIGURE 3 is a vertical cross-sectional view taken on the line III—III of FIGURE 2; and FIGURES 4, 5, 6 and 7 are diagrams illustrating operation of the furnace charging method and apparatus.

Referring now more particularly to the drawings, there is shown diagrammatically in FIGURE 1 and also in FIGURES 4, 5, 6 and 7 an open hearth furnace designated generally by reference numeral 2 which may be of conventional construction. The furnace may be elongated in the direction perpendicular to the paper viewing FIGURES 1, 4, 5, 6 and 7 and may be provided with any suitable number of charging openings 3 each of which may be closed by a door as well known to those skilled in the art. For example, it may be deemed that the open hearth furnace 2 has four charging openings 3. Such a furnace may be charged by a single charging machine or by a charging unit consisting of two charging machines mounted side by side on a car which may be moved to position the charging machines opposite the two doors at one end of the furnace and to position the charging machines opposite the two doors at the other end of the furnace.

The car carrying the charging unit is designated by reference numeral 4. It has wheels 5 operating on tracks 6 extending along the furnace front. Any suitable driving means may be employed to move the car 4 along the rails 6. The charging apparatus may be electrically operated, power for its operation being derived by a trolley 7 engaging and riding along conductors 8 parallel to the furnace front.

Mounted on the car 4 are two charging machines each designated generally by reference numeral 9 and which are of identical construction so that description of one will suffice for both. An operator's cab 10 is positioned on the center line between the two charging machines 9. FIGURES 2 and 3 show two charging machines; the other figures show only one charging machine.

Each of the charging machines 9 comprises a supporting structure which in the form shown in the drawings is the car 4 which affords common support to the two charging machines. Now describing one charging machine, a receptacle 11 for charge material is mounted in mounting means on the car 4. In the structure shown the mounting means for the receptacle 11 comprise a carriage 12. The carriage 12 provides for extending the receptacle 11 into the furnace as will presently be described. It would be possible while still realizing to some extent advantages of my invention to omit the carriage 12 or to in effect dispose that carriage stationarily on the car 4 so the mounting means referred to in certain of the claims may constitute means stationarily mounted on the supporting structure or means such as the carriage 12 which, as will presently be described, is movably mounted on the supporting structure.

Figure 4:
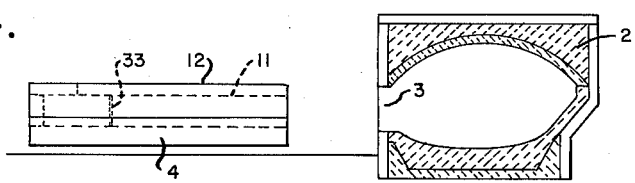

The car 4 has rails 13 on which operate rollers 14 carried by the carriage 12 so that the carriage may move along the car 4 from a retracted position indicated in FIGURE 4 to a projected or advanced position indicated in FIGURES 1, 2, 5, 6 and 7. As shown in FIGURES 1, 2, 5, 6 and 7 the carriage 12 when in its advanced position overhangs the front edge of car 4, and to prevent tilting of the carriage 12 a portion 15 of the car 4 extends over top the outside rollers 14. Pivotally mounted on the carriage 12 at 16 is a latch 17 which when the carriage advances to the position shown in FIGURES 1, 2, 5, 6 and 7 drops by gravity in front of the front edge 18 of the car 4 as shown in solid lines in FIGURE 1. The purpose of the latch 17 is to prevent retraction of the carriage 12 away from the furnace during a portion of the cycle of the charging machine as will be presently explained. Until the latch 17 arrives at the front edge 18 of the car 4 it rides along a surface 19 of the car as shown in dotted lines in FIGURE 1. When the latch 17, being in operative position as shown in solid lines in FIGURE 1, is to be rendered inoperative it is raised so that upon retraction of the carriage 12 toward the left viewing FIGURE 1 it will clear the front edge 18 of the car 4, such raising of the latch being effected by a piston in a cylinder 20 which may be operated by fluid pressure means from the operator's cab 10.

The receptacle 11 is mounted in the carriage 12 for movement along the same general path as the carriage. The carriage 12 has inwardly facing rollers 21 which support the receptacle 11 through a shoulder 22 thereof bearing on the tops of the rollers 21. Strips 50 are attached to the outer faces of the sides of the receptacle 11 and underlie the rollers 21. This insures against tilting or tipping of the receptacle 11 even when it is cantilevered from the carriage 12 as will presently be described. The receptacle 11 is of substantially channel shape in cross section and preferably open at both ends. Means are provided for moving the receptacle 11 from its fully retracted position as shown in FIGURE 4 to its fully advanced or projected position as shown in FIGURES 1, 2 5 and 7. Carried by the car 4 at its front and rear edges respectively are pulleys 23 and 24. A flexible cable 25 has both ends fastened to the receptacle 11 at 26. The flexible cable 25 extends for several turns about the pulley 24, which is the driving pulley, thence under a pulley 27, over a pulley 28, under a pulley 29 and about the pulley 23 as shown in FIGURE 1. Turning of the pulley 24 viewing FIGURE 1 in the clockwise direction projects the receptacle 11 toward the right, i.e., toward the furnace 2. Conversely, turning of the pulley 24 in the counterclockwise direction viewing FIGURE 1 retracts the receptacle 11 toward the left and away from the furnace. The pulley 24 may be operated by any suitable means such as an electric motor acting through a speed reducer, a rack and pinion, etc. Its movement may be controlled from the operator's cab 10.

When the receptacle 11 moves a predetermined distance toward the furnace detents 30 thereon engage stops 31 on the carriage 12, and after such engagement further advance of the receptacle 11 toward the furnace is accompanied by similar movement of the carriage 12 since the receptacle in effect pushes the carriage. Prior to engagement of the detents 30 with the stops 31 the carriage 12 may advance due to friction of the receptacle 11 against the rollers 21 on the carriage. However, the carriage is not positively advanced toward the furnace until the detents 30 engage the stops 31. The extent to which the carriage 12 may advance toward the furnace is limited by a stop member 32 against which the leading outer roller 14 engages after the carriage has advanced a predetermined distance toward the furnace 2. As stated above, in FIGURES 1, 2, 5, 6 and 7 the carriage 12 is shown advanced to its fullest extent, while in FIGURES 1, 2, 5 and 7 the receptacle 11 is shown advanced to its fullest extent.

Mounted to ride along the same general path as the receptacle 11 and the carriage 12 is a plow 33. The lower or active portion of the plow which acts on the charge material is designated 34 and substantially completely fills the cross section of the receptacle 11. That portion of the plow is at all times disposed in the receptacle 11. At its top, the plow has a laterally extending portion 35 at each side which carries rollers 36 which roll on a track 37 carried by the carriage 12 and under a bar 38 also carried by the carriage 12, the tracks 37 and the bars 38 guiding the plow 33 to move substantially along the same path as the receptacle 11 and the carriage 12.

The plow 33 has at each side a latch 39 adapted selectively during the cycle of operation of the charging machine as will presently be described to enter notches 40 and 41 in the top surface 42 of the corresponding upright side portion of the receptacle 11. Each of the latches 39 is pivotally mounted at 43 so that it will drop by gravity into the notches 40 and 41 when disposed thereabove. When the receptacle 11 is retracted away from the furnace while the plow 33 is held stationary, as will presently be described, the latches 39, having inclined surfaces 44, will ride up on the correspondingly inclined surfaces 45 of the notches and become disengaged therefrom and will ride along the top surfaces 42 of the respective sides of the receptacle 11.

The plow 33 has at each side a latch 46 adapted selectively during the cycle of operation of the charging machine as will presently be described to enter notches 47 and 48 in the top surface 49 of the corresponding side portion of the carriage 12. Each of the latches 46 is pivotally mounted at 43 so that it will drop by gravity into the notches 47 and 48 when disposed thereabove. When the receptacle 11 is retracted away from the furnace the latches 46, engaged in one or the other of the notches 47 and 48, hold the plow 33 stationary with the carriage 12.

The latches 39 and 46 may be operated simply by gravity in charging the furnace, but when the plow 33 is to be returned to its retracted position at the end of the charging cycle it is necessary to lift the latches 39 to clear the notches 44 and 45 which may be accomplished manually or by any suitable means (not shown).

A cycle of operation of the charging machine will now be described. With all of the receptacle 11, carriage 12 and plow 33 in their most retracted position as shown in FIGURE 4 a material carrier or bucket 51 containing charge material, such as scrap, delivers its contents into the receptacle 11. The bucket 51 may be handled by the overhead crane, being filled with charge material at a remote location and carried by the crane and set down atop the charging machine. Indeed as soon as a bucket 51 has discharged its load into the receptacle 11 in one cycle it may be removed and replaced by a filled bucket in preparation for the succeeding cycle. The bucket may have an openable bottom so that when it is desired to transfer the charge material from the bucket to the receptacle 11 the bottom of the bucket is opened and the charge material falls by gravity into the receptacle 11. At such time, as above indicated, the receptacle 11 is at its extreme retracted position as are also the carriage 12 and the plow 33. The pulley 24 is then turned in the clockwise direction viewing FIGURE 1 advancing the receptacle 11 toward the furnace. But when the plow 33 is in its most retracted position its latches 44 are engaged in the slots 41 of the receptacle 11 so as the receptacle 11 advances the plow 33 is advanced therewith. As above indicated, the carriage 12 may advance to some extent during the initial advance of the receptacle 11, but when the detents 30 engage the stops 31 the receptable 11 picks up the carriage 12 and the receptacle and carriage advance together toward the furnace until stopped by stop 32. At that time both the carriage 12 and the receptacle 11 are projected to their fullest extent into the furnace as shown in FIGURE 5, the receptacle containing the charge material. Also the latch 17 will be engaged over the front edge 18 of the car 4. Thereupon the pulley 24 is turned in the counterclockwise direction viewing FIGURE 1 retracting the receptacle 11 in the carriage 12, but in the forward position of the receptacle and carriage as shown in FIGURE 5 the latches 46 are in the slots 48 resulting in the plow 33 being held stationary by the carriage 12. Thus the receptacle 11 is retracted away from the furnace relatively to the carriage 12 and the plow 33. But, since the plow 33 remains stationary by reason of being latched to the carriage, as the receptacle 11 is retracted away from the furnace the plow butts against the charge in the receptacle 11 and prevents the charge from moving away from the furnace with the receptacle, the result being that the receptacle is withdrawn from beneath the charge and the charge, to the extent of withdrawal of the receptacle 11 from beneath it, is deposited on the furnace hearth.

After the receptacle 11 has been withdrawn relatively to the carriage 12 and the plow 33 until the latches 39 drop into the slots 40 the direction of turning of the pulley 24 is again reversed and the pulley is turned in the clockwise direction viewing FIGURE 1. This causes the receptacle 11 and the plow 33 to advance together toward the furnace relatively to the carriage 12. Such advance is continued until the latches 46 drop into the slots 47. At that time the direction of turning of the pulley 24 is again reversed and the pulley is turned counterclockwise withdrawing the receptacle 11 relatively to the carriage 12 and the plow 33 since the latches 46 hold the plow stationary in relation to the carriage. The result is that the receptacle 11 is retracted from beneath the remainder of the charge material therein which is prevented from moving away from the furnace with the receptacle by the plow 33. At this time the portion 34 of the plow 33 is just inside the furnace in the position shown in FIGURE 7 and the receptacle 11 has been withdrawn until its right-hand extremity viewing FIGURE 7 is at approximately the same location as the portion 34 of the plow so that the receptacle 11 has been emptied of charge material and the remainder of the charge material is deposited generally atop the portion of the charge material first deposited in the furnace. Thereupon the pulley 24 is turned in the counterclockwise direction viewing FIGURE 1 retracting the receptacle 11 in the carriage 12 until the rear end of the receptacle engages the rear inner wall of the carriage. At that time the latch 17 is raised to permit retraction of the carriage 12 so that the receptacle 11 upon continued retraction carries with it the carriage 12. Such retraction continues until the carriage 12 engages a stop (not shown) on the car 4 at which time the receptacle 11 and carriage 12 are in their fully retracted positions. The operator then lifts the latches 46 from the slots 47 and by any suitable means (not shown) or manually and moves the plow 33 back to its fully retracted position as shown in FIGURE 4.

While I have shown and described a present preferred method of practicing the invention and a present preferred embodiment thereof it is to be distinctly understood that the invention is not limited thereto but may be otherwise variously embodied and practiced within the scope of the following claims.

I claim:

1. A furnace charging method comprising advancing at least partially into a furnace a material support having charge material resting thereon, disposing a plow behind the material, withdrawing the material support under and past the plow so that the plow blocks movement of the material which tends to move therepast along with the withdrawing material support and the material support progressively slides relatively to the material under the plow and out from under the material depositing in the furnace a portion of the material on the material support, thereafter advancing together the material support and plow with the remaining material resting on the material support and with the plow behind such remaining material and thereafter withdrawing the material support under and past the plow so that the plow blocks movement of the remaining material which tends to move therepast along with the withdrawing material support and the material support progressively slides relatively to the remaining material under the plow and out from under the remaining material depositing the remaining material in the furnace generally atop the portion of the material first deposited in the furnace.

2. A furnace charging method comprising advancing at least partially into a furnace a receptacle containing charge material, disposing a plow behind the material, holding the plow stationary and withdrawing the receptacle past the plow so that the plow blocks movement of the material which tends to move therepast along with the withdrawing receptacle and the receptacle progressively slides relatively to the material past the plow and out from under the material depositing in the furnace a portion of the material in the receptacle, thereafter advancing together the receptacle containing the remaining material and the plow with the plow behind such remaining material and thereafter holding the plow stationary and withdrawing the receptacle past the plow so that the plow blocks movement of the remaining material which tends to move therepast along with the withdrawing receptacle and the receptacle progressively slides relatively to the remaining material past the plow and out from under the remaining material depositing the remaining material in the furnace generally atop the portion of the material first deposited in the furnace.

3. Furnace charging apparatus comprising a receptacle for charge material, a plow in the receptacle, means for moving the receptacle with charge material and the plow therein in a plurality of steps into a furnace, means for latching together the receptacle and plow for each such step and means operable following each such step for bodily withdrawing the receptacle relatively to the plow so that upon each such withdrawal the receptacle slides out from under a portion of the material while the plow blocks movement of the material which tends to move therepast along with the moving receptacle to deposit such portion of the material in the furnace.

4. Furnace charging apparatus comprising mounting means, a receptacle for charge material mounted in the mounting means for movement between a relatively remote position and charging position in relation to a furnace, a plow in the receptacle, first fastening means for fastening the plow to the receptacle selectively in a plurality of positions relatively to the receptacle for advance with the receptacle and second fastening means for fastening the plow to the mounting means against retraction when the receptacle is retracted.

5. Furnace charging apparatus comprising a supporting structure, a carriage mounted in the supporting structure for movement toward and away from a furnace, a receptacle for charge material mounted in the carriage for movement relatively thereto and between a relatively remote position and charging position in relation to the furnace, a plow in the receptacle, first fastening means for fastening the plow to the receptacle for advance with the receptacle and second fastening means for fastening the plow to the carriage against retraction when the receptacle is retracted relatively to the carriage.

6. Furnace charging apparatus comprising a supporting structure, a carriage mounted in the supporting structure for movement toward and away from a furnace, a receptacle for charge material mounted in the carriage for movement relatively thereto and between a relatively remote position and charging position in relation to the furnace, a plow in the receptacle, first fastening means for fastening the plow to the receptacle at each of a plurality of positions along the receptacle for advance with the receptacle and second fastening means for fastening the plow to the carriage at each of a plurality of positions along the carriage against retraction when the receptacle is retracted relatively to the carriage.

7. Furnace charging apparatus comprising a carriage, a receptacle for charge material and a plow in the receptacle, means mounting the carriage, receptacle and plow for movement relatively to one another between a relatively remote position and charging position in relation to a furnace and means for selectively fastening the plow to the receptacle and carriage so that the plow may be advanced with the receptacle and maintained stationary with the carriage while the receptacle is retracted relatively to the stationary carriage and plow.

8. Furnace charging apparatus comprising a supporting structure, a receptacle for charge material mounted in the supporting structure for movement between a relatively remote position and charging position in relation to a furnace, a carriage also mounted in the supporting structure for movement along the same general path as the receptacle, a plow in the receptacle, means for selectively fastening the plow to the receptacle and carriage and means for supporting the receptacle in cantilever fashion from the carriage.

9. Furnace charging apparatus comprising a supporting structure, a carriage mounted in the supporting structure for movement toward and away from a furnace, stop means operable to hold the carriage against retraction in the direction away from the furnace when the carriage is in predetermined position advanced toward the furnace, a receptacle for charge material mounted in the carriage for movement relatively thereto and between a relatively remote position and charging position in relation to the furnace, means connecting the carriage to the receptacle whereby when the receptacle advances toward the furnace the carriage advances therewith at least to said predetermined position when the receptacle extends in cantilever fashion toward the furnace from the carriage, a plow in the receptacle advanceable with the receptacle and means maintaining the plow against retraction and in fixed relation to the carriage when the carriage is in said predetermined position and the receptacle is retracted from an advanced position.

10. Furnace charging apparatus comprising mounting means, a receptacle for charge material mounted in the mounting means for movement relatively thereto and between a relatively remote position and charging position in relation to a furnace, a plow in the receptacle, means connecting the plow to a relatively rearward portion of the receptacle so that the plow advances with the receptacle upon a first forward movement of the receptacle until the receptacle reaches an advanced position, means connecting the plow to a relatively rearward portion of the mounting means maintaining the plow against retraction and in fixed relation to the mounting means when the receptacle is first retracted from said advanced position, means connecting the plow to a relatively forward portion of the receptacle so that the plow advances with the receptacle upon a second forward movement of the receptacle until the receptacle against reaches said advanced position and means connecting the plow to a relatively forward portion of the mounting means maintaining the plow against retraction and in fixed relation to the mounting means when the receptacle is again retracted from said advanced position.

11. Furnace charging apparatus comprising mounting means, a receptacle for charge material mounted in the mounting means for movement relatively thereto and between a relatively remote position and charging position in relation to a furnace, a plow in the receptacle, first latching means latching the plow to a relatively rearward portion of the receptacle so that the plow advances with the receptacle upon a first forward movement of the receptacle until the receptacle reaches an advanced position, second latching means latching the plow to a relatively rearward portion of the mounting means maintaining the plow against retraction and in fixed relation to the mounting means when the receptacle is first retracted from said advanced position, third latching means latching the plow to a relatively forward portion of the receptacle so that the plow advances with the receptacle upon a second forward movement of the receptacle until the receptacle again reaches said advanced position and fourth latching means latching the plow to a relatively forward portion of the mounting means maintaining the plow against retraction and in fixed relation to the mounting means when the receptacle is again retracted from said advanced position.

References Cited by the Examiner

UNITED STATES PATENTS

| Re. 7,591 | 4/77 | Rowland | 214—29 |
| 385,249 | 6/88 | Daniels | 214—29 |
| 505,348 | 9/93 | Buchanan | 214—29 |
| 717,334 | 12/02 | Bronder | 214—30 |
| 1,053,020 | 2/13 | Fetherston | 214—30 |
| 1,079,081 | 11/13 | Wedge. | |
| 1,178,317 | 4/16 | Hansford | 214—30 |

HUGO O. SCHULZ, *Primary Examiner.*

UNITED STATES PATENT OFFICE
CERTIFICATE OF CORRECTION

Patent No. 3,211,304                      October 12, 1965

Edward W. Pottmeyer

It is hereby certified that error appears in the above numbered patent requiring correction and that the said Letters Patent should read as corrected below.

Column 1, line 46, for "progressively slides relatively to the" read -- under and past the plow so that the plow --.

Signed and sealed this 21st day of June 1966.

(SEAL)
Attest:

ERNEST W. SWIDER
Attesting Officer

EDWARD J. BRENNER
Commissioner of Patents